Figure 1:
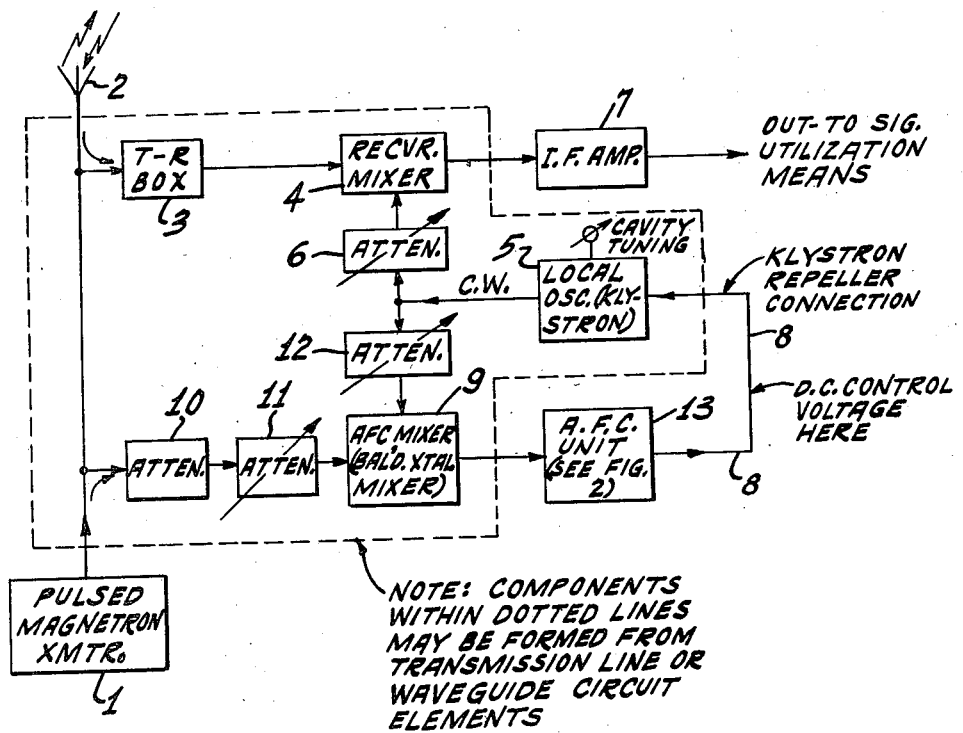

July 9, 1957

R. W. HOWERY ET AL 2,798,946

AUTOMATIC FREQUENCY CONTROL SYSTEM WHICH
STOPS HUNTING WHEN IN TUNE

Filed Nov. 30, 1953

2 Sheets-Sheet 1

Fig_1

INVENTORS
RICHARD W. HOWERY,
ALLEN M. SHEEDER, AND
STILES C. STRIBLING, JR.

BY J.A. Rechif

AGENT

United States Patent Office 2,798,946
Patented July 9, 1957

2,798,946

AUTOMATIC FREQUENCY CONTROL SYSTEM WHICH STOPS HUNTING WHEN IN TUNE

Richard W. Howery, Haddonfield, Allen M. Sheeder, Moorestown, and Stiles C. Stribling, Jr., Haddonfield, N. J., assignors to Radio Corporation of America, a corporation of Delaware Application November 30, 1953, Serial No. 394,942

3 Claims. (Cl. 250—20)

This invention relates to a frequency control system, and more particularly to an automatic frequency control system for pulsed-signal receivers, such as pulsed-radar receivers.

In pulse-echo type obstacle detection or radar systems, particularly those using pulsed magnetrons for generating microwave energy which is radiated into space, it has been found that variations in the frequency of the transmitted energy take place during the pulses. These variations occur in a rather irregular, unpredictable manner and may arise from several causes, among which may be mentioned voltage fluctuations and various impedance mismatches in the transmission lines. These frequency variations occurring during the transmitted pulses deleteriously affect the associated radar receiver at the same location, either in the form of received echoes or in the form of a portion of the output of the transmitter which is abstracted and used in the receiver for frequency control purposes.

In prior conventional radar systems, pulsed-signal receivers of the heterodyne type have been employed including a local heterodyne oscillator whose frequency is controlled by a frequency control system.

In such prior systems there has been used a discriminator responsive to the output of the receiver mixer, or to the output of a separate mixer, and this discriminator had a long time constant output circuit (for example, it included a capacitor charged from the discriminator output voltage) or a "pulse-stretching" circuit. With a system of this type, the frequency control voltage actually effective on the local oscillator mainly results from the discriminator output voltage present at or near the end of the received pulse. Thus, a large frequency excursion at or near the end of the received pulse (resulting in a large excursion of the discriminator output voltage at or near the end of the received pulse), even though it be of relatively short duration, will adversely affect the control information produced by the frequency control system and may cause the frequency of the local oscillator to deviate too far. In fact, in some instances the frequency deviation of the local oscillator was so much that the principal portion of the I. F. signal spectrum received was outside the passband of the receiver, resulting in serious deterioration of signals originating from echoes.

An object of this invention is to devise a frequency control system in which the effect of large frequency excursions, of relatively short duration, on the control information produced by the system, is minimized or greatly reduced.

Another object is to devise a novel frequency control system for pulsed-signal receivers, which takes into proper account variations in the frequency of the received R. F. pulse which may occur during the pulse.

A further object is to provide a frequency control system for pulsed-signal receivers, in which there is developed an average control voltage which is proportional to the departure of the receiver local oscillator frequency from a value equal to the difference between a predetermined I. F. and the average frequency of the received signal pulses.

The objects of this invention are accomplished, briefly, in the following manner: in the AFC portion of a pulse radar receiver, the I. F. out of the AFC mixer is fed through a wide-band I. F. amplifier into a wide-band discriminator having a very short time constant and in the output of which there is connected a circuit having a relatively long time constant for averaging the varying signal out of the discriminator. The averaged signal is amplified and this signal information is translated into control information for the particular type of local oscillator being used, for example, a klystron.

Figure 2:
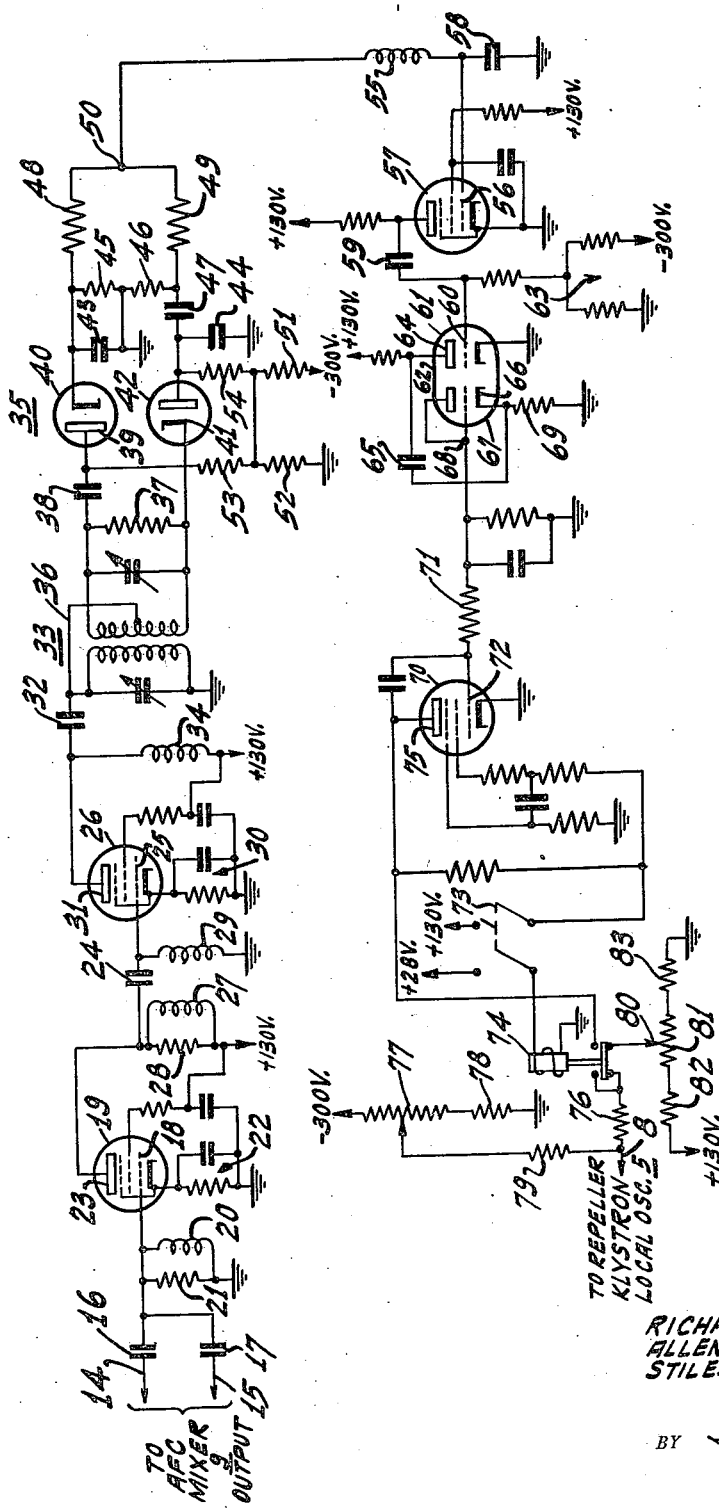

The foregoing and other objects of the invention will be best understood from the following description of an exemplification thereof, reference being had to the accompanying drawings, wherein:

Fig. 1 is a block diagram of a portion of a radar system in which the present invention may be employed; and Fig. 2 is a detailed schematic of one of the units of Fig. 1.

Referring first to Fig. 1, which illustrates the principal components of a pulse-radar system, a pulsed microwave oscillator 1, such as a magnetron, produces pulses of oscillatory energy in the microwave region of the frequency spectrum, which pulses are radiated into space by means of a transmit-receive antenna 2. Antenna 2 functions as both a transmitting and a receiving antenna. These pulses may have a nominal frequency, for example, in the "X" band (approximately 9,000 mc.), and are of quite short duration or length, on the order of one or a few microseconds, and repeated at a certain rather high repetition rate. A so-called T-R box 3, coupled to the antenna, operates to protect the receiver circuits from the very high energy level present on the antenna 2 during pulse transmission. This box, however, operates to pass the echo-signals received on antenna 2 on to receiver mixer 4, substantially without attenuation.

The receiver illustrated uses two converters or mixers, one for echo-signal mixing and one for obtaining the I. F. for AFC purposes. Such a system is usually called a double-mixer AFC system, although separate-mixer AFC would be more precise. The first of the two mixers is the echo-signal or receiver mixer 4 which is coupled to the T-R box output and which is therefore receptive of echo signals picked up by antenna 2. A local oscillator 5, for example a reflex klystron oscillator, feeds continous-wave energy through an adjustable attenuator 6 into the mixer 4. Mixer 4, which may be a balanced crystal mixer of conventional design, is thus also receptive of heterodyning energy from local oscillator 5 and operates to mix together the two input frequencies thereto, to thereby produce beat frequency energy in the I. F. range. If the magnetron 1 operates at a nominal frequency of 9,000 mc., for example, the echo signals picked up by antenna 2 are of course of this same frequency. In this case, the local oscillator 5 would be operating at 8970 mc. when under proper frequency control, giving a 30 mc. I. F. output out of mixer 4 which output is passed on to an I. F. amplifier 7 the output of which is, in turn, fed to any suitable signal utilization means for proper utilization of the echo signals. The system so far described is a quite conventional pulse-radar system and the same will not be further described.

The local oscillator 5 is the oscillator whose frequency is to be controlled by the AFC system of this invention, now to be described. Since the receiver described has a fixed-tuned I. F. amplifier 7, the local oscillator must be controlled in frequency in such a manner that the I. F. produced at the output of mixer 4 will be maintained at a constant value, irrespective of any frequency variations which may occur or tend to occur in the pulse transmitter 1 or in the local oscillator 5 itself. As is well known to those skilled in the art to which this invention relates, the frequency of a reflex klystron oscillator may be controlled over a certain range by appropriate control of the negative potential applied to its repeller electrode. The connection 8 is the connection to the repeller electrode of the reflex klystron 5.

The AFC chain to be described does not work on echo signals but makes use of the main pulse. Therefore, fixed attenuator sections may be inserted before the AFC mixer 9 and there is no need for a T-R box here. Pulses from the magnetron transmitter 1 are fed through a fixed attenuator 10 and an adjustable attenuator 11 to the AFC mixer 9, which like mixer 4 may be a balanced crystal mixer. Continuous wave energy from local oscillator 5 is fed through an adjustable attenuator 12 to mixer 9. Mixer 9 is thus receptive of energy from transmitter 1 and of energy from local oscillator 5 and operates to mix together the two input frequencies thereto, to thereby produce beat frequency energy in the I. F. range, which energy is clearly of the same frequency as that produced in mixer 4, for example 30 mc.

The I. F. output of mixer 9 is applied to an AFC unit 13, to be described hereinafter in detail, which unit provides in its output connection 8 a D. C. control voltage which is applied to the repeller electrode of klystron local oscillator 5 to control the frequency thereof.

Reference will now be made to Fig. 2, which is a detailed circuit schematic of the AFC unit 13. The AFC mixer 9 is preferably of the balanced crystal type and is provided with two separate output leads 14 and 15 which are coupled through separate respective coupling capacitors 16 and 17 to the control grid 18 of a pentode vacuum tube 19 connected to function as a first I. F. amplifier. In this connection, it will be recalled that the AFC mixer 9 mixes together the two inputs thereto (one from local oscillator 5 and one from magnetron transmitter 1) to produce a beat frequency in the I. F. range, for example nominally 30 mc. As an example, tube 19 may be of the 6AK5W type.

As previously stated, pulsed oscillators such as magnetron transmitter 1 do not necessarily produce pulses of constant R. F. or microwave frequency, that is, variations in the frequency of the pulse occur during the pulse; such frequency variations appear in the output of AFC mixer 9, one input to which is obtained from magnetron transmitter 1, and are thus applied to I. F. amplifier 19. In order to effect faithful conversion of the frequency excursions of the received signal into voltage excursions (thereby to enable more accurate frequency control of the local oscillator), wide-band circuits are utilized. The I. F. amplifier tube 19 is therefore connected to act as a wide-band amplifier, having a bandwidth sufficient to pass the principal spectrum energy of the received pulses. Since the I. F. energy applied to the input of the AFC unit 13 is in the form of pulses (no I. F. energy appears in the output of mixer 9 between the pulses of transmitter 1, at which times only the continuous wave energy from local oscillator 5, in the microwave range, is applied to mixer 9), the bandwidth of the I. F. amplifier 19 would of course need to be greater than if a continuous wave signal were applied to the input of this amplifier. However, the bandwidth of the I. F. amplifier 19 is made even greater than that necessary for passing pulses of constant frequency, in order to faithfully pass the frequency excursions or frequency variations which occur during the received pulses. In this connection, it will be noted that any frequency variations occuring during the pulses of energy sent out by transmitter 1 will also appear as corresponding frequency variations in the I. F. output of mixer 9, applied to the input of I. F. amplifier 19.

In order to provide a wide-band input circuit for tube 19, an inductance 20 and a resistor 21 are connected in parallel from control grid 18 to ground. The inductance 20, with either one of the capacitors 16 or 17, provides a circuit which is approximately series resonant at 30 mc., the nominal I. F., and this circuit is loaded down by resistor 21 to give a wider bandwidth. The tube 19 has an RC cathode network 22 of the usual type to provide self-bias for this tube.

The amplified I. F. appearing at the anode 23 of tube 19 is coupled by means of a coupling capacitor 24 to the control grid 25 of a pentode vacuum tube 26 which functions as a second I. F. amplifier. Tube 26 may also be of the 6AK5W type, for example. In order to provide a wide-band interstage coupling between tubes 19 and 26, an inductance 27 is connected into the anode circuit of tube 19, and this inductance is resonated with the interelectrode capacitance of tube 26, plus any wiring capacitance, and plus the interelectrode capacitance of tube 19, and is loaded down by a resistor 28 connected across inductance 27. An inductance 29 connected between control grid 25 and ground provides a high impedance to the I. F. and acts as a grid return. Tube 26 has an RC cathode network 30 of the usual type to provide self-bias for this tube.

The further amplified I. F. appearing at the anode 31 of the second I. F. amplifier tube 26 is coupled through a coupling capacitor 32 to the tuned primary winding of a discriminator transformer 33. An inductance 34 is connected into the anode circuit of tube 26, passing direct current but acting as a high impedance choke to the I. F. Discriminator transformer 33 is coupled to the output of the second I. F. amplifier 26, providing a wide-band coupling between this amplifier and a wide-band discriminator-detector 35 having a crossover frequency at the nominal (desired) I. F. value, which in the example is 30 mc. The transformer 33 has a tuned primary winding and a tuned secondary winding, one end of the primary winding being grounded and a connection 36 being provided between the ungrounded end of the primary and the center tap of the secondary, in the usual manner. A resistor 37 is connected across the secondary winding, to load it down.

The discriminator 35 is designed to have wide-band characteristics, or a rather large peak-to-peak separation in the typical discriminator S-shaped response curve. The discriminator, as well as other components of the receiver, must have a bandwidth determined by the length of the pulses for which it is designed (the length of the pulses produced by transmitter 1), since the pulse has an energy spectrum covering a range of frequencies, due to its very form. In addition, this bandwidth (of the discriminator, as well as of the I. F. amplifiers) must be made sufficiently large to allow frequency excursions of the received pulses (during such pulses) to be converted to voltage excursions as faithfully as possible. For these reasons, the peak-to-peak separation of the frequency discriminator 35 is made equal to the principal spectrum width of the received pulses. This is done by proper choice of the characteristics of transformer 33 and of its loading 37.

The discriminator 35 is similar to the so-called "peak-reading discriminator," and in discriminator 35 positive and negative pulses are produced across separate resistors and the amplitudes of these opposite-polarity pulses are compared to develop the discriminator output voltage. One end of the secondary of transformer 33 is connected through a capacitor 38 of rather large capacitance (the need for which will hereinafter become apparent) to the anode 39 of a diode detector 40, while the other end of this secondary is connected to the cathode 41 of a diode detector 42. Although separate envelopes are shown for diodes 40 and 42, the electrodes of both of these diodes preferably may be located in the same envelope, a tube of the 6AL5W type being utilized for this purpose. A capacitor 43 is connected from the cathode of diode 40 to ground, while a capacitor 44 is connected from the anode of diode 42 to ground. A pair of load resistors 45 and of the pulse amplifier 61, but to stop pulses of positive polarity appearing in such output.

The circuitry for the phantastron search tube 70 is quite conventional and quite similar to that illustrated and described on pp. 65–69 of "Microwave Receivers," first edition, by S. N. Van Voorhis, vol. 23 of the M. I. T. Radiation Laboratory Series, published by McGraw-Hill Book Company in 1948. The circuit operates as described in the textbook reference just cited. When the double-pole single-throw "AFC-MFC" switch 73 is closed to the "AFC" position, positive voltage is applied by an obvious circuit through one of the switch poles to the anode and screen grid of tube 70. Then, if the transmitter 1 is turned off so that no pulses occur at the output of discriminator 35, or if the local oscillator 5 is so far off its proper frequency (as it may be, for example, when first energized) that the I. F. out of mixer 9 is outside the maximum frequency range of the discriminator 35, the phantastron sweeping action occurs, and the phantastron anode voltage executes a series of sawtooth downward sweeps, separated by moderately long recovery periods.

When switch 73 is closed (the "AFC" position thereof), a low relay-energizing potential (e. g., 28 volts) is applied to the energizing winding of a relay 74 to cause it to close its normally-open contacts (its "AFC" contacts), thus connecting the anode 75 of tube 70 through a resistor 76 to the klystron repeller connection 8 of the local oscillator 5. Then, the downward sweeps of the voltage at anode 75 (which sweeps may be from about 100 volts down to ten volts, for example) are applied to the repeller of the klystron local oscillator, to cause the repeller potential to sweep through a corresponding range of negative voltage. The repeller is biased negatively by means of a potentiometer arrangement including a potentiometer 77 connected in series with a fixed resistor 78, between the negative terminal of a unidirectional potential source and ground, the movable tap on potentiometer 77 being connected through a resistor 79 to the repeller connection 8.

The downward sweeps of the voltage at anode 75, thus applied to the repeller of the reflex klystron local oscillator 5, cause the local oscillator frequency to sweep upward over a range of 30 to 50 mc., for example. If no lock-in of the local oscillator occurs during the sweep, or if the transmitter is not turned on, these relatively long upward frequency sweeps of the local oscillator, followed by rapid downward frequency sweeps to the beginning frequency, will continue at a definite periodic rate (e. g., one sweep each second) determined by the constants of the phantastron circuit, since under these (assumed) conditions the sawtooth downward sweeps of the phantastron anode voltage will continue as long as the phantastron tube 70 is supplied with anode potential.

As previously stated, the pulse amplifier tubes 57 and 61 constitute stages for amplification of the averaged signal appearing at the output side of averaging circuit 55, 58, while the diode-phantastron control circuit 67, 70 constitutes means for translating the signal information appearing at the output of the two-stage pulse amplifier into control information for the particular type of local oscillator being used, which in the example is a reflex klystron oscillator.

Due to the fact that two stages of pulse amplification are used between the output point 50 of discriminator 35 and the search stopper diode 67, there is no reversal of polarity between these points, and the polarity of the pulses appearing at anode 64 is the same as that appearing at the discriminator output, at all times. In a particular system according to this invention which was constructed and successfully tested, the magnetron 1 operated at a nominal frequency of 9,000 mc., the local oscillator operating below this frequency at a nominal frequency of 8970 mc., to give an I. F. of 30 mc. in mixers 4 and 9. The characteristic of discriminator 35 is such that for local oscillator frequencies below 8970 mc. (I. F.'s above 30 mc.) and within the maximum frequency range of the discriminator, the discriminator output is positive, while for local oscillator frequencies above 8970 mc. (I. F.'s below 30 mc.) the discriminator output is negative. As previously stated, the phantastron anode voltage sweep causes the local oscillator to sweep upward in frequency.

Now assume that the transmitter 1 is turned on, as well as the local oscillator 5, and that the switch 73 is operated to the closed or "AFC" position. The phantastron 70 starts to sweep the frequency of local oscillator 5 upward in the manner above described, from below its nominal frequency of 8970 mc. When the local oscillator frequency (as it sweeps upward) reaches a value such that the I. F. frequency difference out of mixer 9 comes within the maximum frequency range of the discriminator 35, pulses begin to appear at the discriminator output point 50. The pulses originally appearing, however, are positive, since the I. F. produced at the output of mixer 9 is originally greater than, or above, 30 mc. These positive pulses are applied to the cathode 66 of diode 67 but, because they are of the wrong polarity to be passed by this diode, are not passed on to the control grid 72 of phantastron tube 70, and such phantastron therefore continues its sweeping. In this connection, it may be observed that the diode 67 is in effect connected in series between coupling capacitor 65 and control grid 72, the cathode 66 of this diode being connected to capacitor 65 and the anode (point 68) of the diode being connected to control grid 72; in this repsect, the circuit of this invention is somewhat different from the "shunt diode" phantastron circuit disclosed in the textbook reference cited.

As the phantastron continues its sweeping of the local oscillator frequency, the I. F. out of mixer 9 will reach the discriminator crossover frequency of 30 mc. The phantastron sweep is stopped as soon as the discriminator crossover frequency is passed, and as soon as negative pulses begin to appear at the discriminator output (in response to the I. F. out of mixer 9 falling below the discriminator crossover frequency of 30 mc.). At this time, negative pulses appear at the output of the pulse amplifier 61. These negative pulses are applied to the cathode 66 of diode 67, which then conducts, causing a negative voltage to appear at anode point 68. As soon as the voltage at this point becomes equal to the voltage on the phantastron control grid 72 (this equality of voltages can be made to occur very shortly after the I. F. has passed through the discriminator crossover frequency), the current flow in resistor 71 ceases, and the downward sweep of the anode voltage at 75 therefore stops. Then, the system is locked and the local oscillator frequency is no longer swept.

The local oscillator frequency is thereafter held to the required value, since any I. F. deviations (such deviations, in the present system, being in the frequency difference between the frequency of the local oscillator and the average frequency of the magnetron pulses, because of the action of the averaging circuit 55, 58) change the voltage appearing at discriminator output point 50 and thus tend to change the voltage applied to the control grid 72 so as to restore the frequency of the local oscillator to the right value. This is true because, when locked, the pentode 70 acts as a normal D. C. amplifier. As long as the voltage on control grid 72 is maintained at a sufficiently negative value, the sweeping of the phantastron described above will not be re-initiated and tube 70 will operate as a D. C. amplifier.

To summarize the above-described action, the frequency of local oscillator 5 sweeps until an I. F. signal of the proper frequency is produced to operate the A. F. C. system (including the discriminator) and make the local oscillator lock in. The local oscillator sweep (produced 46 are provided, resistor 45 being connected from the cathode of diode 40 to ground and resistor 46 being connected from capacitor 47 to ground. Capacitor 47 is connected between the anode of diode 42 and resistor 46. The capacitor 47 is of rather large capacitance and the need for the same will hereinafter become apparent. To complete the discriminator circuit and to provide a circuit for properly combining the pulse-recurring voltages produced by diodes 40 and 42, a resistor 48 is connected between the cathode of diode 40 and the discriminator output point 50, while a resistor 49 is connected between capacitor 47 and said point 50.

It is quite important for the proper operation of this invention, that the discriminator 35 be provided with a fast time constant discriminator load. The values of capacitors 43 and 44 and of resistors 45, 46, 48 and 49 must be chosen to result in a fast enough time constant so that the frequency excursions of the magnetron transmitter 1 during its pulses are represented by voltage variations at the discriminator output point 50. Then, the discriminator 35 acts to produce at the output point 50 a series of pulses (occurring at the repetition rates of the pulses produced by transmitter 1) the voltage excursions of which during the pulses faithfully represent frequency excursions of the received RF (microwave) signal occurring during the pulses, since such frequency excursions of magnetron transmitter 1 during its pulses cause excursions in the produced I. F. from its nominal value of say 30 mc. Thus, the output voltage at point 50 is a varying signal which varies during the received pulses, and this signal may vary from a positive potential value through zero to a negative potential value, and perhaps back again, in any random manner, during the pulse. The output voltage of the discriminator corresponds at every instant, of course, to the frequency difference between the actual I. F. input to the discriminator at that same instant and the predetermined crossover I. F. of the discriminator, say 30 mc. When the I. F. input to the discriminator is exactly at the discriminator crossover frequency, the discriminator output is zero volts, when the I. F. input to the discriminator is less than the crossover frequency the discriminator output voltage is of one polarity, say negative, and when the I. F. input to the discriminator is greater than the crossover frequency the discriminator output voltage is of the opposite polarity (positive).

Now referring back to Fig. 1, certain spurious information may appear at the output of AFC mixer 9. The use of a balanced AFC mixer reduces even order harmonics, but odd order harmonics (third, fifth, etc.) appear. For example, if the local oscillator 5 is set to a frequency which is removed from the frequency of the magnetron transmitter 1 by 10 megacycles, then 10-megacycle information will appear at the output of mixer 9. Because of the nonlinear characteristics of this mixer, harmonic frequencies will be produced therein, among them being 30 megacycles (the third harmonic of 10 megacycles). This 30-megacycle information can be amplified by the 30-megacycle I. F. amplifier in AFC unit 13, which unit is coupled to the output of AFC mixer 9. This spurious information, amplified by the I. F. amplifier in Fig. 2, will appear at the output of the 30-megacycle discriminator 35. This spurious information is effectively eliminated by the discriminator bias arrangement now to be described.

A negative bias potential is applied to the anodes of both diodes 40 and 42. The spurious 30-mc. discriminator information is substantially smaller than the desired information, and such spurious output information is in fact insufficient in magnitude to overcome the bias applied to the diodes, so that the spurious voltage is not rectified by the diodes and does not appear at the discriminator output point 50. A voltage divider consisting of two resistors 51 and 52 connected in series between a source of negative potential and ground, supplies negative bias potential to the diode anodes. The common junction point of resistors 51 and 52 is connected to anode 39 through a resistor 53, and to the anode of diode 42 through a resistor 54. Now, the need for capacitors 47 and 38 will become apparent. Capacitor 38 prevents the negative potential from being applied to cathode 41, while capacitor 47 prevents the negative potential from being applied to the cathode of diode 40.

Since pulsed oscillators do not necessarily produce pulses of constant frequency, but on the other hand ordinarily produce pulses the frequency of which varies during the pulses, a means for obtaining maximum response of the frequency control system to the major portion of the spectral energy, is required, in order to provide optimum receiver performance. In other words, the effect of large discriminator output voltage excursions of relatively short duration (resulting from large frequency excursions, of relatively short duration, during the received pulses), on the control information produced by the frequency control system, should be minimized. According to this invention, these results are effected by developing an average control voltage, from the discriminator output, which is proportional to the departure of the local oscillator frequency from a value equal to the difference between a predetermined I. F. and the average frequency of the received signal pulses, or in other words, by attenuating rapid fluctuations in the output voltage of the discriminator.

The output point 50 of the discriminator 35 is coupled by means of a series inductance 55 to the control grid 56 of a pentode vacuum tube 57 serving as a pulse amplifier. A capacitor 58 is connected from control grid 56 to ground. The inductance 55 and capacitor 58 together constitute a low-pass filter or averaging circuit having a time constant long enough to attenuate rapid fluctuations in voltage from the discriminator 35. The network 55, 58 averages the voltage excursions appearing in the varying signal output of the discriminator during the pulse, so that the voltage applied to control grid 56 is a voltage pulse of amplitude proportional to the departure of the average I. F. frequency during the pulse from a fixed crossover frequency such as 30 mc. Thus, the varying signal out of discriminator 35 is averaged in the circuit 55, 58, which minimizes the effect of large voltage variations of relatively short duration (resulting from frequency excursions of short duration during the received pulses) on the voltage pulses produced by the frequency control system and appearing on control grid 56.

Tube 57 constitutes the first stage of a two-stage pulse amplifier, and this tube may be of type 6AK5W. The amplified pulses appearing at the anode of tube 57 are coupled through a coupling capacitor 59 to the control grid 60 of the first half 61 of a twin-triode vacuum tube 62, for example of the 12AT7 type. Triode section 61 is operated with a small negative grid bias obtained from a voltage divider 63 and functions as the second stage of the two-stage pulse amplifier. Since a two-stage pulse amplifier is utilized for amplification of the discriminator output, there will be no polarity reversal and the polarity of the pulses at anode 64 of triode section 61 will be the same as at the discriminator output point 50.

The signal at anode 64 is coupled through a coupling capacitor 65 to the cathode 66 of the second half 67 of twin-triode tube 62. Triode section 67 is connected as a diode by connecting its anode and grid directly together at point 68. A resistor 69 is connected between cathode 66 and ground. The diode-connected triode 67 is connected to function as a "search stopper" diode in conjunction with a "phantastron search" pentode vacuum tube 70, for example of the 6AS6 type. The point 68 (anode of diode 67) is connected through a resistor 71 to the control grid 72 of tube 70.

The rectifier "search stopper" 67 is so poled as to pass pulses of negative polarity appearing in the output by the phantastron action) stops when the A. F. C. system locks, due to the action of the search stopper diode 67.

The open position of switch 73 is the M. F. C. (manual frequency control) position, which may be used when manual control of the frequency of local oscillator 5 is desired, for checking or for proper adjustment of the "cavity tuning" (see Fig. 1) of klystron oscillator 5. When switch 73 is opened, anode potential is removed from tube 70, so that such tube is then incapable of acting either as a phantastron or as a D. C. amplifier. The AFC system is then disabled. At the same time, opening of switch 73 deenergizes relay 74, causing it to take the position illustrated, wherein anode 75 is disconnected from the repeller connection 8. At the same time, the normally-closed lower contacts of relay 74 are closed, to connect the movable arm 80 of a potentiometer 81 through resistor 76 to the repeller connection 8. The potentiometer 81 is the central part of a bleeder system which also includes two series resistors 82 and 83, the whole being connected between a positive potential (130 volts) source and ground. The values of the components 81, 82 and 83 are such that by moving arm 80 from one end of its travel to the other on potentiometer 81, the repeller potential may be swung over the same range as that provided by tube 70 acting as a phantastron. Thus, for the example previously given, arm 80 will be at a potential of 100 volts at one end of its travel and at a potential of ten volts at the other end of its travel.

What is claimed is:

1. In a receiver for spaced radio frequency pulses the frequency of which may vary during each pulse, said receiver including a local continuous wave heterodyne oscillator the frequency of which may be controlled and including also a mixer receptive of said pulses and of continuous wave energy from said oscillator: an amplifier having a bandwidth sufficient to pass the principal spectrum energy of the received pulses, means coupling said amplifier to the output of said mixer, a frequency discriminator having a peak-to-peak separation at least as great as the spectrum width of the received pulses, means coupling said discriminator to the output of said amplifier, an averaging circuit coupled to the output of said discriminator, a pulse amplifier coupled to the output of said averaging circuit, a rectifier coupled to the output of said pulse amplifier, and means coupled to the output of said rectifier for controlling the frequency of said oscillator in response to said rectifier output.

2. In a receiver for spaced radio frequency pulses the frequency of which may vary during each pulse, said receiver including a local continuous wave heterodyne oscillator the frequency of which may be controlled and including also a mixer receptive of said pulses and of continuous wave energy from said oscillator: a wide-band amplifier coupled to the output of said mixer, a wide-band frequency discriminator coupled to the output of said amplifier, an averaging circuit coupled to the output of said discriminator, a pulse amplifier coupled to the output of said averaging circuit, a rectifier coupled to the output of said pulse amplifier, and means coupled to the output of said rectifier for controlling the frequency of said oscillator in response to said rectifier output.

3. In a receiver for spaced radio frequency pulses the frequency of which may vary during each pulse, said receiver including a local continuous wave heterodyne oscillator the frequency of which may be controlled and including also a mixer receptive of said pulses and of continuous wave energy from said oscillator: a wide-band amplifier coupled to the output of said mixer, a wide-band frequency discriminator coupled to the output of said amplifier, a voltage-averaging circuit coupled to the output of said discriminator, said voltage-averaging circuit comprising a serially-connected inductor and capacitor; a pulse amplifier coupled to the common junction of said inductor and said capacitor, a rectifier coupled to the output of said pulse amplifier, and means coupled to the output of said rectifier for controlling the frequency of said oscillator in response to said rectifier output.

References Cited in the file of this patent

UNITED STATES PATENTS

| 2,206,695 | Guanella | July 2, 1940 |
| 2,377,327 | Seeley | June 5, 1945 |
| 2,425,013 | Stotz | Aug. 5, 1947 |
| 2,434,293 | Stearns | Jan. 13, 1948 |
| 2,434,294 | Ginzton | Jan. 13, 1948 |
| 2,705,756 | Steandberg | Apr. 5, 1955 |

FOREIGN PATENTS

| 613,212 | Great Britain | Nov. 24, 1948 |